(12) United States Patent
McKeeth (10) Patent No.: US 7,188,175 B1
(45) Date of Patent: Mar. 6, 2007

(54) METHOD AND SYSTEM FOR COMMUNICATING BETWEEN CLIENTS IN A COMPUTER NETWORK

(75) Inventor: James A. McKeeth, Nampa, ID (US)

(73) Assignee: Web.com, Inc., Atlanta, GA (US)

( * ) Notice: Subject to any disclaimer, the term of this patent is extended or adjusted under 35 U.S.C. 154(b) by 0 days.

(21) Appl. No.: 09/544,355

(22) Filed: Apr. 6, 2000

(51) Int. Cl.
G06F 15/13 (2006.01)

(52) U.S. Cl. .................. 709/227; 709/203; 709/221; 709/245; 370/356

(58) Field of Classification Search ................ 709/227, 709/235, 244, 245, 203, 221; 370/352, 356
See application file for complete search history.

(56) References Cited

U.S. PATENT DOCUMENTS

| | | | | |
|---|---|---|---|---|
| 6,026,441 A * | 2/2000 | Ronen | ......................... | 709/227 |
| 6,065,043 A * | 5/2000 | Domenikos et al. | ........ | 709/203 |
| 6,101,182 A * | 8/2000 | Sistanizadeh et al. | ....... | 370/352 |
| 6,108,704 A * | 8/2000 | Hutton et al. | ................ | 709/227 |
| 6,286,039 B1 * | 9/2001 | Van Horne et al. | .......... | 709/221 |
| 6,301,609 B1 * | 10/2001 | Aravamudan et al. | ...... | 709/207 |
| 6,381,650 B1 * | 4/2002 | Peacock | ..................... | 709/245 |
| 6,396,830 B2 * | 5/2002 | Aravamudan et al. | ...... | 370/356 |
| 6,411,966 B1 * | 6/2002 | Kwan et al. | ................. | 707/201 |
| 6,424,170 B1 * | 7/2002 | Raman et al. | ................. | 326/30 |
| 6,463,471 B1 * | 10/2002 | Dreke et al. | ................. | 709/224 |
| 6,480,484 B2 * | 11/2002 | Morton | ........................ | 370/352 |
| 6,564,216 B2 * | 5/2003 | Waters | ......................... | 707/10 |
| 7,039,688 B2 * | 5/2006 | Matsuda et al. | ............ | 709/220 |

OTHER PUBLICATIONS

DynIP(SM), A Division of CanWeb Internet Services Ltd., "DynIP(SM) Client For Microsoft Windows 95/98/NT, User's Guide", Version 4.01, pp. I-iv and 1-32 (1999).

* cited by examiner

*Primary Examiner*—Viet D. Vu
*Assistant Examiner*—Jinsong Hu
(74) *Attorney, Agent, or Firm*—Thomas, Kayden, Horstemeyer & Risley, LLP (57) ABSTRACT

A method and system for communicating among clients in a client-server computer network. The method and system allow a client to identify another client using a first identifier, such as a domain name of the other client. It is not necessary for the client to identify the other client with its network address, such as the Internet protocol (IP) address of the other client. The system comprises a server that updates a domain name system (DNS) server with the most recent IP address of the other client. In the event that the other client is off-line, the client may be connected to a Web page of the other client to leave and retrieve messages.

28 Claims, 7 Drawing Sheets

METHOD AND SYSTEM FOR COMMUNICATING BETWEEN CLIENTS IN A COMPUTER NETWORK

BACKGROUND OF THE INVENTION

1. Field of the Invention

The invention relates generally to communication of information among clients and servers in a computer network, such as the Internet. More particularly, this invention relates to a method and system for communicating among clients over the Internet.

2. Description of the Related Art

With the explosive expansion in use of computer networks, such as the Internet, the demand for exchanging data, voice, and video has increased to record levels. Internet service providers (ISPs) continue to strive to keep up with the increased demand for service. To meet such demand, the Internet uses a system of numbers, known as an Internet protocol (IP) address, to identify every computer connected to the Internet. Generally, the IP address is an identifier for a computer or device operating on a transmission control protocol/Internet protocol (TCP/IP) network, such as the Internet. The format of an IP address is a 32-bit numeric address written as four numbers separated by periods. Each number may be within the range from and including zero to 255. Within a private network, an IP address may be assigned at random to each computer, as long as the IP address is unique to each computer. However, connecting a private network to the Internet requires using registered IP addresses (commonly referred to as "Internet addresses") to avoid duplicate addresses for different private networks. The number of unassigned Internet addresses is running out, so a new scheme called Classless Inter-Domain Routing (CIDR) is gradually replacing the present IP addressing scheme.

A large number of users obtain access to the Internet from commercial ISPs via a dial-up telephone modem. In a technical sense, ISPs are considered private networks and, thus, an ISP assigns a predetermined number of IP addresses among its users using any desired assigning method, such as dynamic host configuration protocol (DHCP). Thus, each time a user logs onto the ISP to connect to the Internet, the ISP assigns an IP address to the user to uniquely identify the user's computer ("client") to other users on the Internet worldwide. Knowing the IP address, any Internet user may contact the client by entering the IP address in its application, which is usually a data, voice, or video communication software. The process is very similar to day-to-day telephone number dialing. Knowing a telephone number, a telephone user may call the telephone number from any telephone unit around the world.

Typically, a local telephone company assigns a unique telephone number to a new telephone customer. The assigned telephone number is static, i.e., fixed and does not change during the duration of service. Thus, any telephone user may reach the new telephone customer by simply dialing the customer's telephone number. However, as described above, the IP address of an ISP client is dynamic (i.e., not static) and, thus, changes each time the client signs on to access the Internet. Accordingly, an Internet user cannot simply contact the client, because the client's IP address is unknown. Hence, each time an Internet user wishes to contact the client, the client must provide the Internet user with the client's currently assigned IP address. In view of the dynamic characteristic of the Internet, Internet users encounter limitations when desiring to contact or exchange live data with the client, e.g., voice or video conferencing.

Thus, there is a need in the computer network technology for a method and system that allow network users to communicate despite the dynamic character of IP addresses. Such method and system should allow users to communicate without having to know a client's IP address in advance.

SUMMARY OF THE INVENTION

The invention provides a method of communication between a first client and a second client in a client-server network wherein the second client is allocated an interactive file. The method comprises identifying the second client with a first identifier of the second client. The method further comprises determining, based on the first identifier of the second client, a second identifier of the second client. The method further comprises establishing, based on the second identifier of the second client, a communication link between the first client and the second client if the second client is connected to the network. The method further comprises establishing, based on the second identifier of the second client, a communication link between the first client and the interactive file of the second client if the second client is disconnected from the network.

In another embodiment, the method comprises accepting a request for communication with the first client via the network based, at least in part, on identifying the second client by an identifier that is equivalent to a network address of the second client. The method further comprises establishing, based on the network address of the second client, a communication link between the first client and the second client, if the second client is connected to the network. The method further comprises establishing, based on the network address of the second client, a communication link between the first client and the interactive file of the second client, if the second client is disconnected from the network. In another embodiment, the method comprises receiving from the second client a request for connecting to the network. The method further comprises communicating a network address of the second client to a server, which is configured to store the network address with an identifier of the second client. The method further comprises establishing, based on receiving the identifier of the second client from the first client, a communication link between the first client and second client, if the second client is connected to the network. The method further comprises establishing, based on receiving the identifier of the second client from the first client, a communication link between the first client and the interactive file of the second client, if the second client is disconnected from the network.

In yet another embodiment, the invention provides a system for communicating among a plurality of clients in a client-server network. The system comprises a first client that is configured to communicate with a second client via the network. The second client establishes communication with the first client by identifying the first client with a first identifier of the first client. The first client is allocated an interactive file. The system further comprises at least one server in communication with the first client. The server is configured to identify the first client by a second identifier of the client. The server is further configured to direct the second client to the first client when the client is on-line, and direct the second client to the interactive file when the first client is off-line.

In yet another embodiment, the system comprises means for identifying the second client with a first identifier of the second client. The system further comprises means for determining, based on the first identifier of the second client, a second identifier of the second client. The system further comprises means for establishing, based on the second identifier of the second client, a communication link between the first client and the second client if the second client is connected to the network. The system further comprises means for establishing, based on the second identifier of the second client, a communication link between the first client and the interactive file of the second client if the second client is disconnected from the network.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
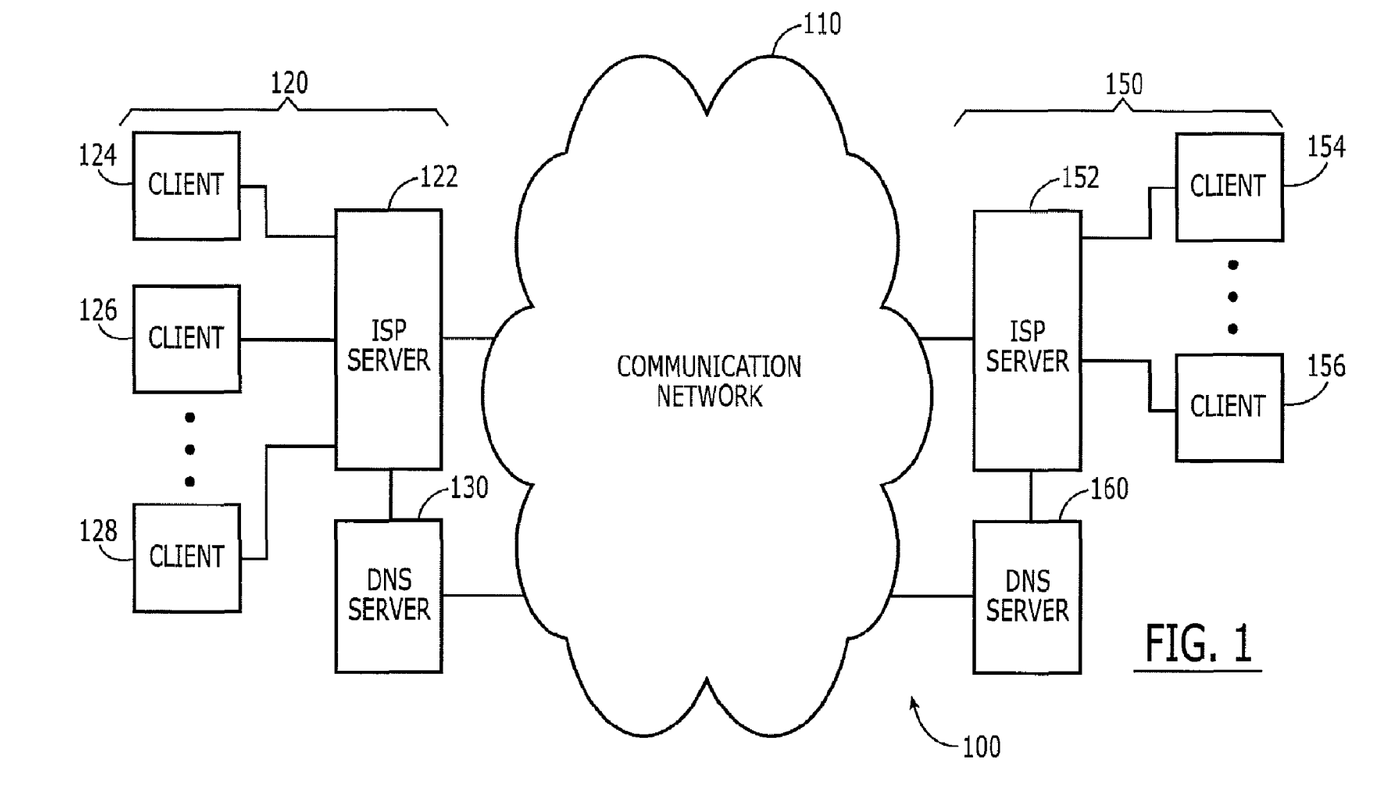
FIG. 1 is a functional block diagram illustrating a plurality of computer networks connected via a communication network.

FIG. 1 is a functional block diagram of two or more computer networks 120 and 150 connected via a communication network 110. For the purpose of this disclosure, the combination of these two or more networks 110, 120, and 150 is referred to as the Internet 100. In principle, these networks operate in accordance with a client-server network architecture in which each computer or application on the network is either a client or a server. Thus, the network 120 comprises a plurality of clients 124, 126, and 128 that communicate to an Internet service provider (ISP) server 122 via respective dial-up modem links, or other similar links. Typically, each network includes at least one Domain Name System (DNS) server. Thus, the network 120 includes a DNS server 130 that is in communication with the ISP server 122 and the communication network 110. The DNS server provides a method of converting Internet domain names (e.g., www.site.com) to corresponding IP addresses (e.g., 121.132.143.154) to be understood by computer servers. This process is commonly referred to as "resolving" the domain name into an IP address. The DNS specification may be found in Request for Comments (RFC) 1035, authored by P. Mockapetris, and published by the Network Working Group (November 1987), and its subsequent revisions.

Similarly, the network 150 comprises a plurality of clients 154 and 156 that communicate to an ISP server 152 via respective dial-up modem links, or other similar links. The network 150 further comprises a DNS server 160 that is in communication with the ISP server 152 and the communication network 110. Although a limited number of ISP servers are shown in FIG. 1, it is understood that ISPs often employ a plurality of servers that are configured for various applications. As indicated above, the ISP servers 122 and 152 provide access to other computer networks connected to the Internet 100. Although only a limited number of clients are shown in FIG. 1, the shown clients are only illustrative of hundreds or thousands of clients. Typically, a client includes a personal computer (PC) or workstation on which users run applications. On the other hand, a server is a powerful computer dedicated to perform specialized functions, such as managing disk drives, printers, or network traffic. The server may be programmed with instructions to process client requests at least in part in accordance with the DNS specification.

For a client (e.g., the client 124) to communicate with another client (e.g., the client 156), the client 124 may enter the IP address of the client 156 to establish a communication link with the client 156. However, as noted above, when the client 156 connects to the ISP server 152 via a dial-up modem link, a DHCP server (which may be the ISP server 152 or another ISP server) is likely to assign a different IP address to the client 156 each time the client 156 logs onto the ISP server 152. In this embodiment, it is desirable to assign a fixed and unique domain name (e.g., username.m-webpages.net) that uniquely identifies each client, e.g., the client 156. Thus, when the client 156 subscribes for or enters into service with the ISP, the ISP administrator determines a domain name that uniquely identifies the client 156 at all times, despite changes to the client IP address. The client may also subscribe for subdomain names such as worldwide Web (www), file transfer protocol (ftp), mail, and others.

In one embodiment, the ISP server 152 is configured to identify the client 156 with its unique domain name as follows. Once the client 156 dials up the server 152, the client 156 enters its identification information, such as a username and password to identify itself to the server 152. If desirable, such identification information may be encrypted using any available encryption method (e.g., secure socket link or SSL) to protect such information from access by computer hackers. Once the server 152 verifies that the identification information is valid, the DHCP server (e.g. server 152) assigns and transmits an IP address to the client 156 to identify the client 156 to other users of the Internet 100 during the log session.

The server 152 is configured to keep track of the IP address that is assigned to the client 156. More particularly, the server 152 is configured to update an IP address table in the DNS server 160 to correlate or match the domain name (e.g., username.mwebpages.net) of the client 156 with its latest IP address. Once a user sends a TCP/IP inquiry (e.g., packet) destined to the domain name of the client 156, the DNS server 160 resolves the domain name of the client 156 with the latest IP address. Thus, when any user (e.g., the client 126) wishes to establish a communication link with the client 156, the client 126 may simply identify the client 156 by its unique domain name, no matter what link the client 156 is using to access the ISP server 152, and no matter how many different IP addresses the client 156 is assigned each time it connects to the server 152.

Figure 2:
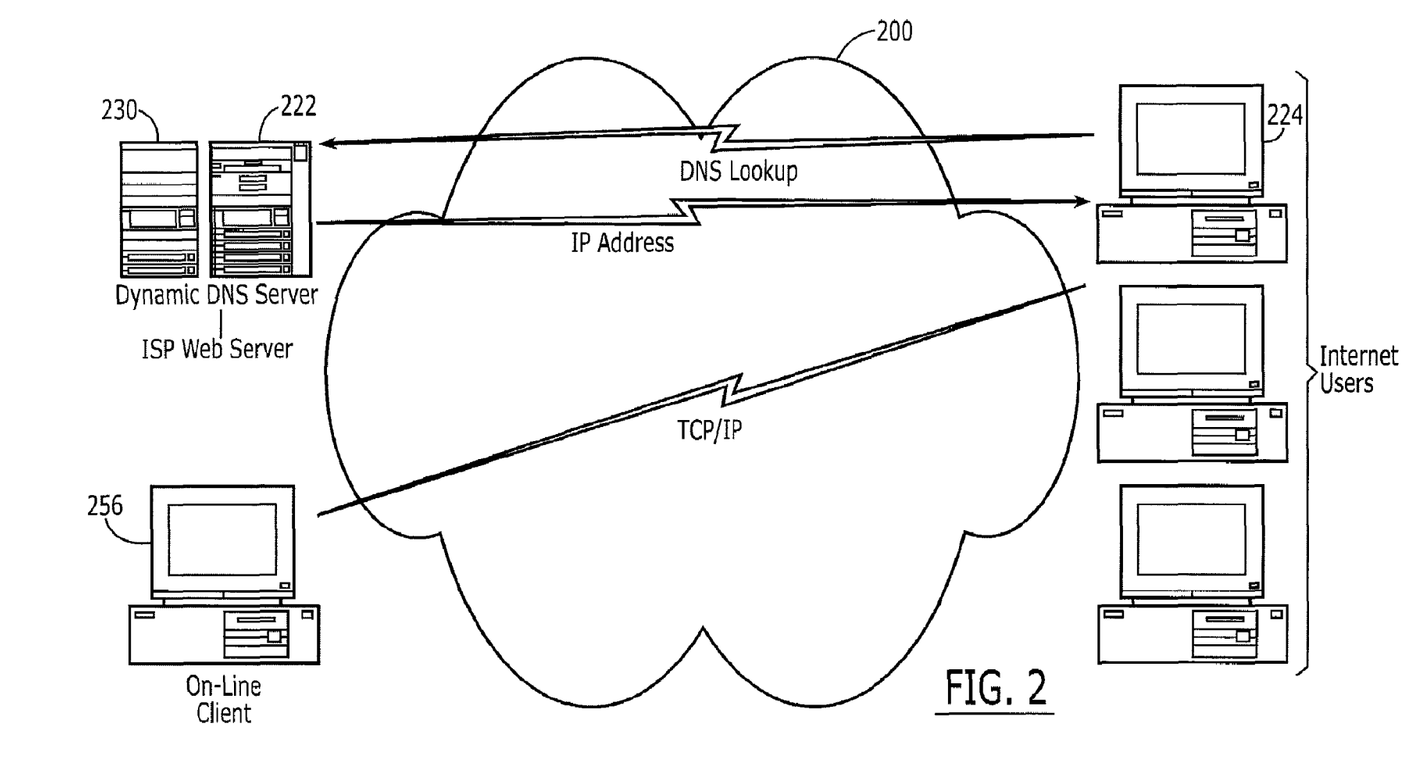
FIG. 2 is a block diagram illustrating communication between an Internet user and an on-line client in accordance with the invention.

FIG. 2 is a block diagram illustrating communication between an Internet user 224 and an on-line client 256 in accordance with the invention. In this embodiment, the Internet user 224 may be located in any network that accesses the Internet 100 (FIG. 1), whereas the client 256 may be located in a different network. The client 256 may connect to the Internet via an ISP server 222 using a dial-up modem link. As noted above, the ISP network includes (or has access to) at least one DNS server 230 which is dedicated to resolving domain names into IP addresses. When the client 224 wishes to establish a communication link with the client 256, the client 224 may enter the domain name of the client 256. However, pursuant to the TCP/IP specification, it is necessary for the client 224 to identify the IP address of the client 256. As noted above, this identification is performed by "resolving" the domain name of the client 256, as described hereinafter.

DNS instructions are executed using a specialized software program, such as a Berkeley Internet Name Domain (BIND) software developed by the University of California, Berkeley. The BIND software is most commonly used by the server 222. The BIND software includes a server and a resolver module that allow clients to name resources and share this information with other servers in the network 200. Client applications, such as Web browsers, interact with the domain name space through ISP servers. The format of client requests and responses is specific to the local host and its operating system. Using a communication application, such as Microsoft NetMeeting, the client 224 is configured to request to be connected to (i.e., establish a link with) the client 256 by entering "username.mwebpages.net". To establish the link between the client 224 and the client 256, the DNS server 230 (or another DNS server) is configured to resolve the domain name username.mwebpages.net. The DNS server 230 responds to the client 224 by supplying the domain name-to-IP address conversion from a list of IP addresses available in an accessible memory (not shown in this figure). The memory is typically in the form of a cache memory that allows rapid access to the cached (i.e., stored) information.

To maintain a current list of IP addresses, the server 230 periodically establishes a link with one or more other DNS servers to acquire a copy of an up-to-date list of IP addresses or to check that an existing list has not changed. Also, the DNS server 230 caches one or more of the most recently resolved IP addresses from previous client transactions. Both of these techniques ensure that the server 230 has an up-to-date list of IP addresses as topology of the Internet changes. In this embodiment, the ISP server 222 is configured to update the list of IP addresses of the DNS server 230 in response to change in client on-line/off-line status. This feature is described in detail below.

Once the IP address of username.mwebpages.net is identified, the DNS server 230 communicates the IP address to the client 224, which in turn establishes a TCP/IP session with the client 256. Pursuant to the DNS specification, the entire "resolving" process is substantially transparent to the user. In other words, the user does not necessarily know that an IP address is resolved for the domain name.

Figure 3:
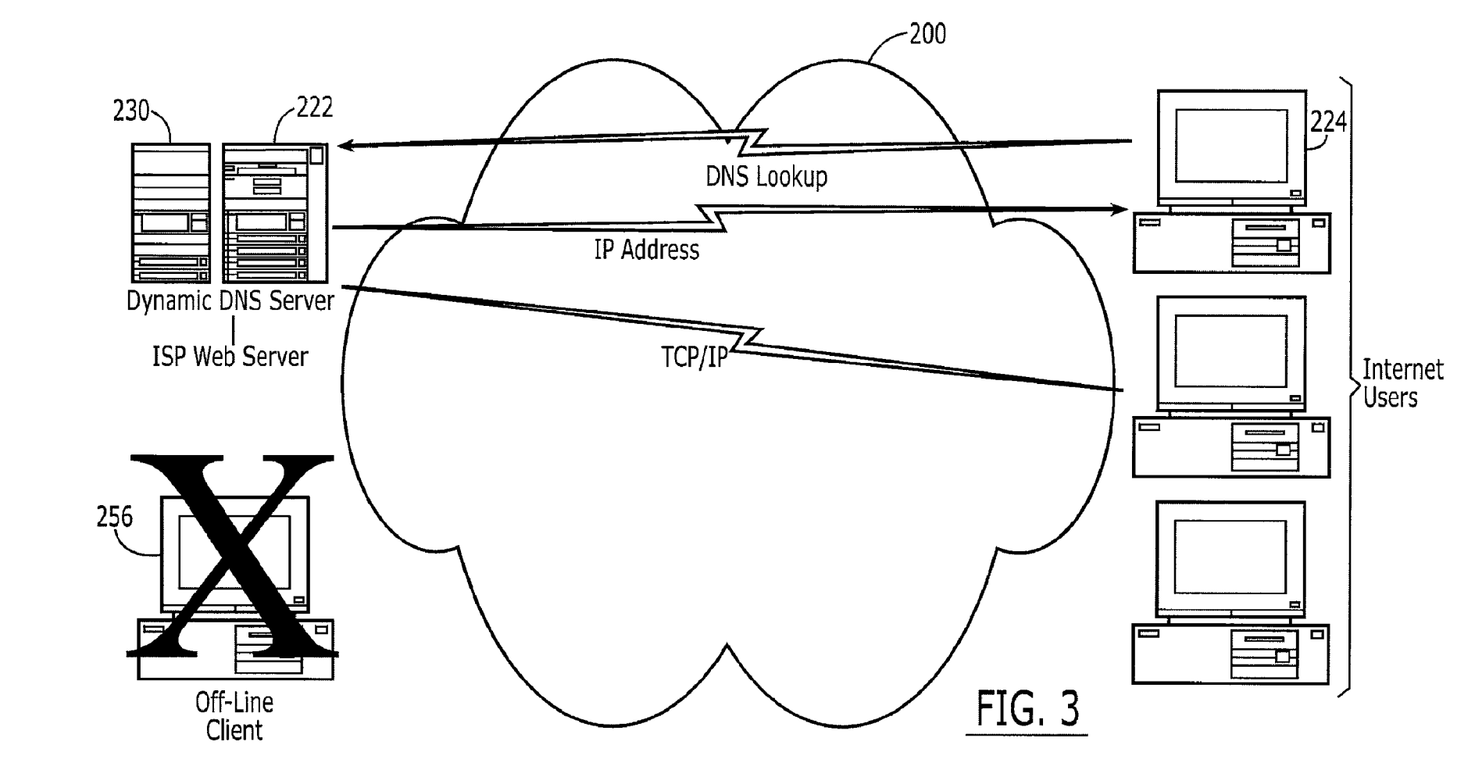
FIG. 3 is a block diagram illustrating communication between an Internet user and an off-line client in accordance with the invention.

FIG. 3 is a block diagram illustrating communication between the Internet user 224 and the client 256 when the client 256 is off-line, in accordance with the invention. The block diagram of the network of FIG. 3 is substantially similar to the network of FIG. 2. When the client 224 enters the domain name of the client 256, the DNS server 230 is configured to resolve the domain name into an IP address of the client 224, as described above. When the client 256 is off-line, the ISP server 222 is configured to detect that the client 256 is off-line using any of the well-known methods.

For example, in one embodiment, the server 222 is configured to periodically listen for an "alive" signal from the client 256. The alive signal may be in a form of at least one packet having any predetermined bit values to indicate that the client 256 is still connected to the Internet.

If no alive signal is received from the client 256 within a predetermined time interval (e.g., 10, 20, or 30 seconds), the server 222 transmits a verification signal to the client 256 to confirm that the client 256 is off-line. The verification signal may be in the form of a Packet Internet Groper ("ping") signal that determines whether a particular IP address is accessible. The verification works by sending a packet to the specified address (i.e., client 256) and waiting for a reply packet. If no reply packet is received from the client 256, the server 222 updates client information to indicate that the client 256 (i.e., username.mwebpages.net) is off-line. The server 222 is configured to re-direct all client TCP/IP inquiries to an interactive file, such as a "Web page" of the client 256. The Web page of the client 256 acts like an answering machine wherein users wishing to contact the client 256 may leave messages to and retrieve information from the Web page of the client 256, while the client 256 is off-line. The Web page may be stored in the server 222 as part of the client's allocated or subscribed memory space (e.g., 5 Megabytes) with the ISP. Thus, in this embodiment, the server 222 re-directs the client 224 TCP/IP connection or session to the Web page of the client 256. In other embodiments, the interactive file of the client 256 may include any desired computer file, such as a streaming audio, video, an FTP server file, or a queuing mail server file.

Figure 4:
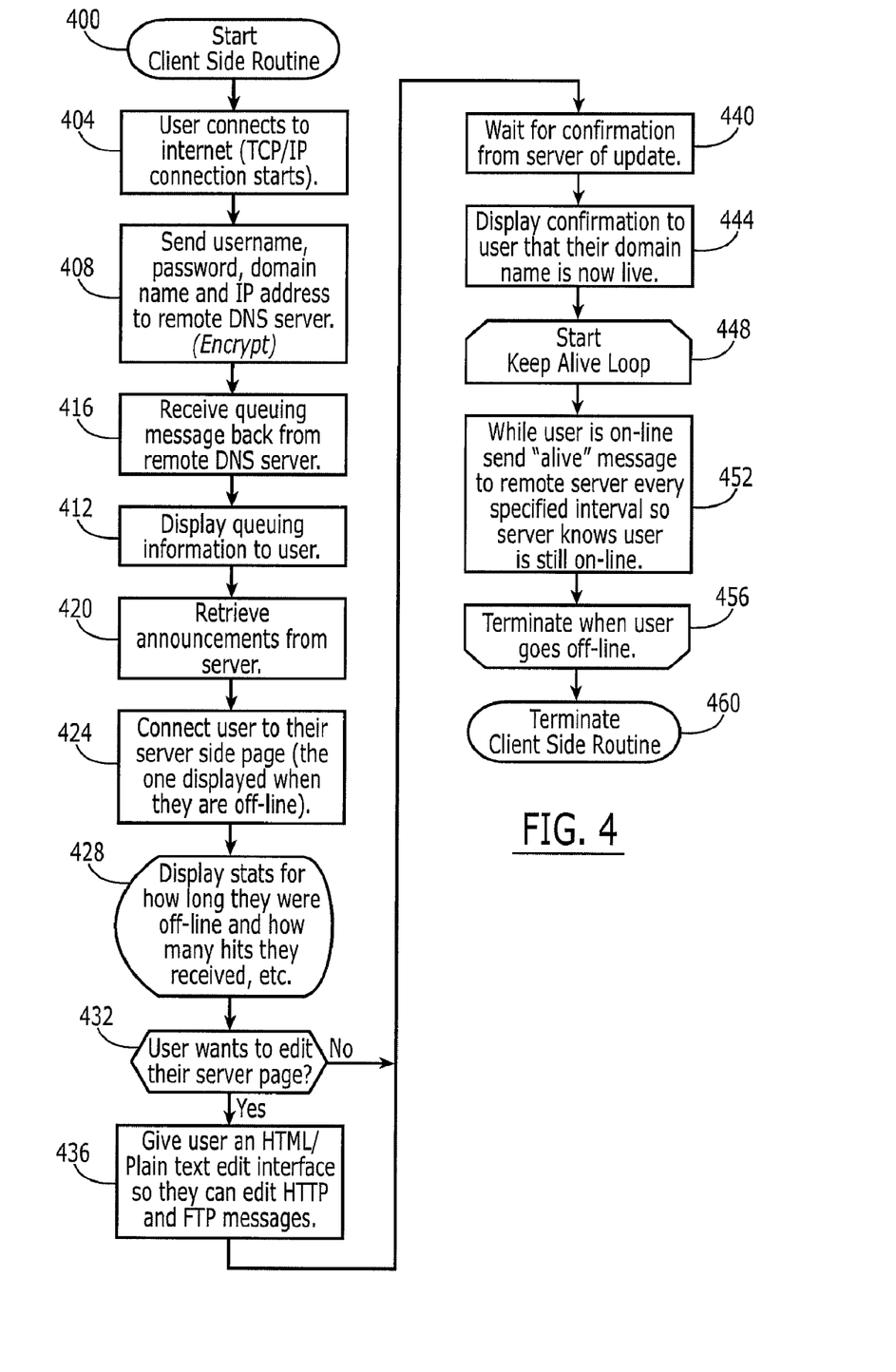
FIG. 4 is a flowchart describing the process of establishing a connection by a client in one of the networks of FIG. 1.

FIG. 4 is a flowchart describing the process of establishing a connection by the client 124 with the server 122 in the network 120 of FIG. 1. In this embodiment, the client 124 is configured to run an application software that communicates with the server 122 when the client 124 is on-line. The process starts at block 400 when a user of the client 124 runs a dial-up software to connect to the server 122. At block 404, the client 124 requests connection to the Internet through the server 122, and connection is granted after verifying that identification information of the client 124 is valid. At block 408, the client 124 sends identification information and IP address of the client 124 to the DNS server 130. As noted above, the identification information may include a username, password, and/or domain name. By sending such information to the DNS server 130, the client 124 requests updating the table of IP addresses of the DNS server 130.

Once the identification information is verified to be valid, the client 124 receives a queue message from the DNS server 130. The queue message indicates that the IP address table of the DNS server 130 will be updated at the next scheduled update time. Accordingly, the information and IP address of the client 124 is stayed in a queue until the next update occurs. This ensures that the DNS server 130 is not interrupted each time a new client logs onto the Internet. Information and IP addresses of all clients that log onto the Internet within a predetermined time interval (e.g., 1, 2, or 3 minutes) are used to update the IP address table of the DNS 130. At block 412, the client 124 displays the queue information to the user so that the user knows when he or she is expected to become accessible or reachable by other users who know the domain name of the client 124.

At block 420, the client 124 may retrieve announcements or other general informational messages from the server 122. At block 424, the server 122 connects the client 124 to the Web page of the client 124. As noted above, the Web page of the client 124 may include any desirable data. Thus, at block 428, the client 124 displays to the user information such as time of last log-on of the client 124, duration the client 124 was off-line, number of hits received by the Web page while the client 124 was off-line, any messages received from other users, and similar information. Thus, the user may retrieve, edit, and send any messages using the Web page. At block 432, the server 122 determines if the user wishes to edit or change the Web page of the client 124. If so, the operation proceeds to block 436 where the user is provided with an appropriate editor, such as a hypertext markup language (HTML) or plain text editor. In another embodiment, the client 124 may configure (i.e., edit or change) the Web page at any time, and not just at time of logging onto the server 122. As noted above, when the interactive file is expressed by media (e.g., audio or video) other than an HTML file, the client 124 may configure the interactive file using appropriate hardware/software, such as a microphone, headphone, and/or video camera. If, on the other hand, the user does not wish to perform any editing, the operation proceeds to block 440 where the user waits for server notification that the update of the DNS server 130 is successful.

Once the update of the IP address table of the DNS server 130 is complete, the operation proceeds to block 444 where the client 124 displays a message to the user indicating that the domain name "username.mwebpages.net" is live. This indicates that any user with access to the Internet may contact the user of the client 124 using the domain name of the client 124, despite a dynamically assigned IP address for the client 124. At block 448, the client 124 begins an alive loop with the server 122. As noted above, and as shown in block 452, a client 124 may run a software module that generates an alive signal (e.g., at least one TCP/IP packet) at periodic time intervals to notify the server 122 that the client 124 is still connected to the Internet. It is desirable to set the duration of the time interval long enough to avoid data transfer slowdown, but short enough to promptly announce that the client 124 is off-line. At block 456, when the client 124 goes off line, the client 124 terminates the alive loop and sends an "off-line" message to the server 122. The process terminates at 460.

In one embodiment, one or more of the processes described in connection with the flowchart of FIG. 4 may be implemented as software modules, or firmware in a processor, in the client 124, the ISP server 122, the DNS server 130, or any other server that is accessible by the ISP network 120. Although the description of the flowchart of FIG. 4 is presented in connection with the client 124, it is understood that the flowchart may apply to any other client (e.g., the client 128) that accesses the Internet.

Figure 5:
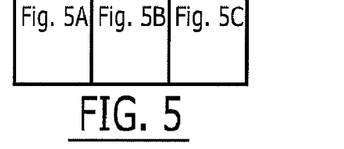
FIG. 5 is a flowchart describing the process of handling a connection by an ISP server in one of the networks of FIG. 1.
Figure 5A:
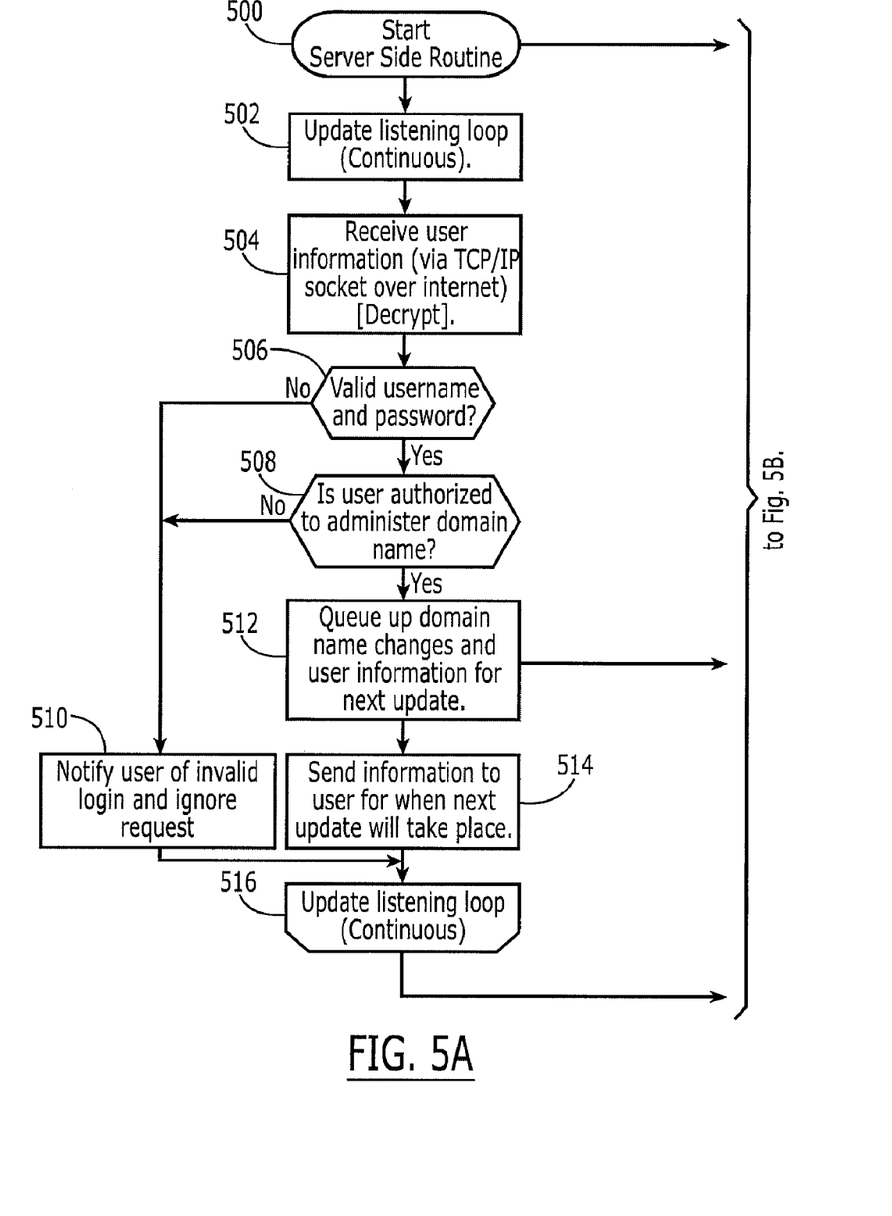
Figure 5B:
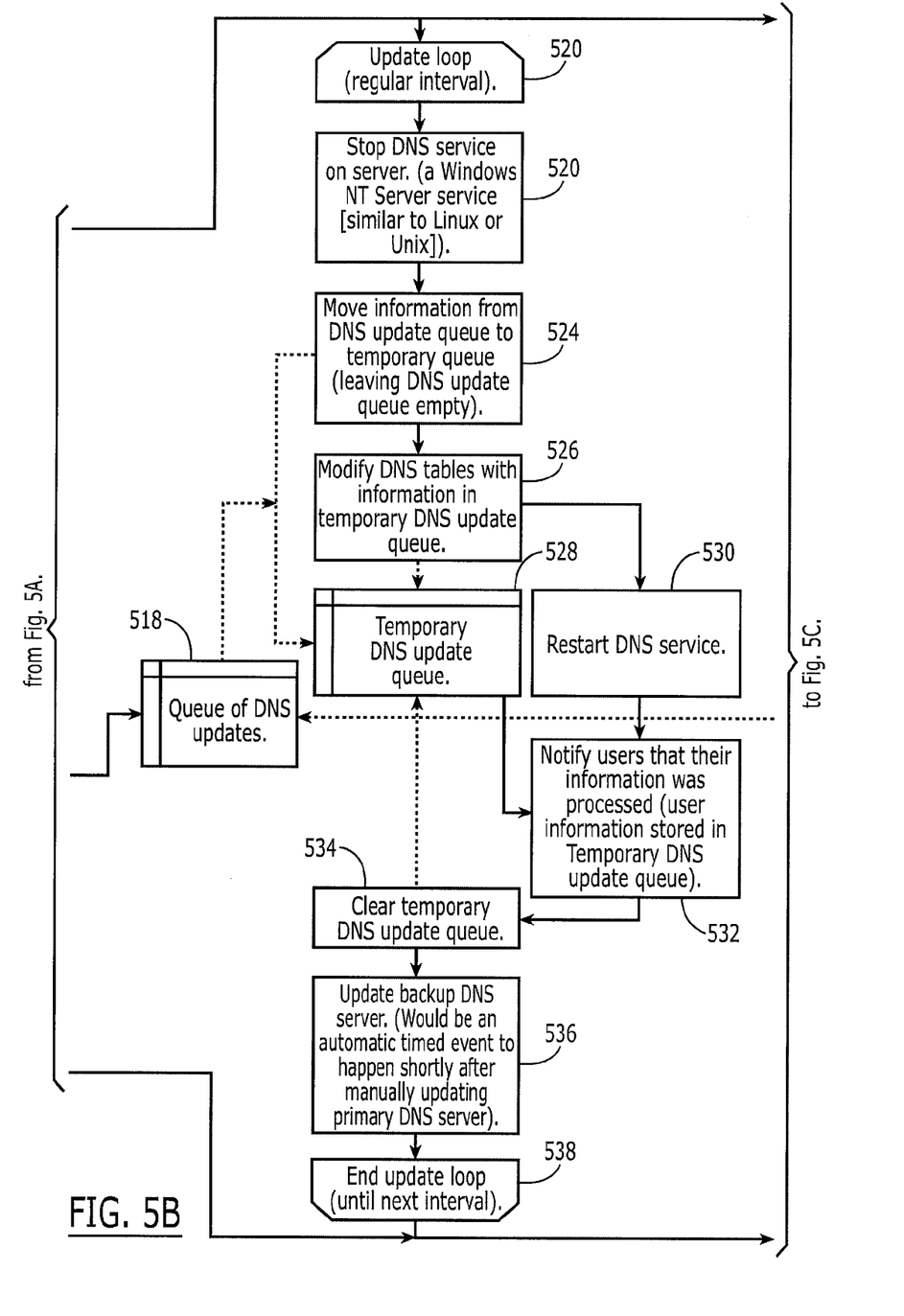
Figure 5C:
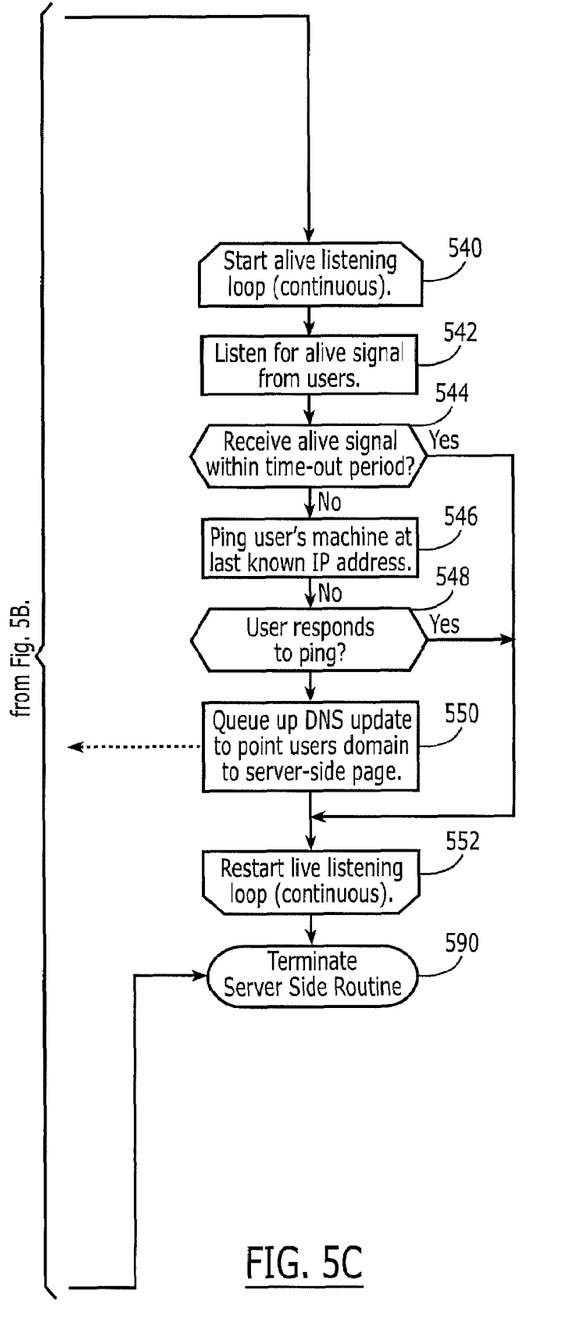

FIG. 5 is a flowchart describing the process of handling a connection by the server 122 in one of the networks (e.g., the network 120) of FIG. 1. The following describes operation of the network 120 at the server end. The process begins at block 500 when the DNS server 130 is powered on, reset, or the software application is run. The DNS server 130 includes (or has access to) at least three software modules that run in parallel (i.e., simultaneously). The three modules are represented by an update listening loop (block 502), a regular interval loop update (block 520), and an alive listening loop (block 540). Each branch of these loops is described separately hereinafter.

The update listening loop 502 represents a software module that allows the DNS server 130 to listen to new clients (e.g., the client 124 having a fixed domain name) that wish to log onto the Internet. When the client 124 wishes to update the DNS server 130 with the current IP address of the client 124, the user of the client 124 enters identification information. Thus, at block 504, the DNS server 130 receives the identification information and IP address from the user of the client 124. As noted above, identification information may include a username, password, and/or domain name. At this stage, it is assumed that the client 124 is already logged onto the Internet via the ISP server 122. Hence, the client 124 may communicate with the DNS server 130 via a TCP/IP socket connection. A socket commonly refers to a software object that connects an application to a network protocol, such as TCP/IP.

At block 506, the DNS server 130 determines whether the username and password are valid. If such information is not valid, the process proceeds to block 510 where the DNS server 130 notifies the user of the client 124 that identification information is not valid, and ignores the request of the client 124. If, on the other hand, the identification information is valid, the operation proceeds to block 508 where the DNS server 130 determines if the user of the client 124 is authorized to administer a domain name. This determination may be necessary because the user of the client 124 may have not subscribed for domain name service and, hence, may not have a fixed domain name. If so, the operation proceeds to block 510. If, on the other hand, the user of the client 124 is authorized to administer a domain name, the process continues to block 512 where the DNS server 130 queues the identification information and IP address of the client 124 until the next update of the IP address table of the DNS server 130.

At block 514, the DNS server 130 sends information to the client 124. The information notifies the user of the client 124 of the expected time of the next update of the IP address table of the DNS server 130. As noted above, this duration typically occurs within minutes. Meanwhile, as described in connection with the operation of the network 120 in FIG. 4 above, the user of the client 124 may have access to his or her web page. At block 516, the operation of the DNS server 130 returns to the update listening loop described beginning at block 502.

The purpose of the regular interval update loop 520 is to update the IP address table of the DNS server 130 with most current IP addresses that correspond to the fixed domain names of subscribing clients. The regular interval update loop 520 of the DNS server 130 may operate as follows. At block 522, the DNS service of resolving IP addresses into domain names is halted or stopped temporarily, so that an update of the IP address table can occur. During the temporary stop of the DNS service, DNS service is routed to a backup DNS server (not shown in FIG. 1) in accordance with the TCP/IP specification. As shown in FIG. 5, the block 518 represents the queue (e.g., a memory space that is accessible by the DNS server 130) of DNS updates received from block 512. In another embodiment, the DNS service is not disrupted. To update the IP address table of the DNS server 130, DNS updates may be communicated to the DNS server 130 using an application program interface (API) call. As is well known in the art, API represents a set of routines, protocols, and tools for building software applications. At block 524, the information that is present in the queue 518 is moved or transferred to a temporary queue (shown as block 528) to hold the latest DNS updates. This transfer empties and makes the DNS update queue 518 available for upcoming updates by new clients. At block 526, the IP address table of the DNS server 130 is modified or updated with the information from the temporary DNS queue 528. At block 530, the DNS service of the DNS server 130 is resumed.

At block 532, the DNS server 130 notifies users of all clients, whose identification information was present in the most recent temporary DNS update queue 528, that their information was processed successfully. This indicates to the user that the DNS server 130 is updated with the respective client's current IP address, so that other users may contact the respective client using its fixed and known domain name. At block 534, the temporary DNS update queue 528 is cleared or emptied, thereby making it available for holding next update information from the DNS queue 518. At block 536, the backup DNS server is updated with the latest IP address information currently present in the DNS server 130. Pursuant to the TCP/IP specification, updating the backup DNS server is an automatically timed event that occurs shortly after the primary DNS server 130 is updated. The regular interval update loop is temporarily terminated (at block 538) until the next update where the process returns to block 520.

The purpose of the alive listening loop 540 is to maintain an up-to-date record of the clients that are currently logged onto the Internet via the server 122. The alive listening loop 540 may operate as follows. At block 542, the server 130 listens to an alive signal (e.g., a TCP/IP packet) from each client that is logged onto the Internet via the server 122. At block 544, the server 122 determines whether such alive signal is received within a predetermined interval of time from each logged-on client. If so, the alive listening loop continues to block 552 indicating a return to the start of the alive listening loop at block 540. If, on the other hand, the alive signal is not received from a particular client (e.g., the client 124) within a predetermined time interval (e.g., 10, 20, or 30 seconds), the process continues to block 546 where the server 122 transmits a verification signal to the last known IP address of the client 124 to confirm that the client 124 is off-line. As noted above, the verification signal may be in the form of a ping signal that determines whether a particular IP address is accessible. At block 548, the server 122 determines if the client 124 responds to the ping signal. If no reply packet is received from the client 124 at block 550, the server 122 updates client information to indicate that the client 124 (i.e., username.mwebpages.net) is off-line. The server 122 is configured to re-direct all client TCP/IP inquiries to the Web page of the client 124. Thus, in this embodiment, the server 122 re-directs future TCP/IP connection or session to the Web page of the client 124. The process continues to block 552, as described above. The block 590 indicates terminating the operation of the above-described loops and processes.

In one embodiment, one or more of the processes described in FIG. 5 may be implemented as software modules, or firmware in a processor, of the ISP server 122, the DNS server 130, or any other server that is accessible by the ISP network 120. For example, the ISP server 122 may provide the above-described service to clients and, thus, no special software is needed to be implemented in the client 124. Although the description of the flowchart of FIG. 5 is presented in connection with the network 120, it is understood that the flowchart may apply to any other network (e.g., the network 150) that accesses the Internet.

In view of the foregoing, it will be appreciated that the invention overcomes the long-standing need for a method and system that allow network users to communicate despite the dynamic character of IP addresses. Such method and system allow users to communicate without having to know a client's IP address in advance. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes that fall within the meaning and range of equivalency of the claims are to be embraced within their scope.

What is claimed is:

1. A method for updating Domain Name System (DNS) information in response to a change in client status, the method comprising the steps of:
   receiving a client request to update DNS information on a DNS server, the client being subscribed to a domain name:
   on receipt of the client request, assigning an IP address to the client and updating an entry in an IP address table on the DNS server such that the domain name corresponds with the assigned IP address;
   determining a client status of on-line or off-line; and
   responsive to off-line determination, updating the IP address table on the DNS server such that the domain name corresponds with an interactive file.

2. The method of claim 1, wherein the interactive file comprises a first web page that is configured to provide information to the client and configured to allow the first client to leave a message for a second client.

3. The method of claim 1, further comprising:
   on receipt of the client request, connecting the client to a second web page associated with the client.

4. The method of claim 3, wherein the second web page includes at least one of messages received while client was off-line, a time of last log-on by client, or a duration the client was off-line.

5. The method of claim 1, further comprising:
   on receipt of the client request, determining if the client is authorized to administer the domain name.

6. The method of claim 1, wherein the update step further comprises:
   queuing the client request on a DNS update queue;
   moving the request from the DNS update queue to a temporary queue; and
   updating the IP address table of the DNS server with the request from the temporary queue.

7. The method of claim 6, further comprising:
   notifying the client that the request has been queued; and
   notifying the client that the request has been processed.

8. The method of claim 1, wherein the determining step further comprises:
   monitoring arrival of a signal that is periodically transmitted by the client, the arrival of the signal indicating that the status of the client is on-line.

9. The method of claim 8, wherein the determining step further comprises:
   determining that the status of the client is off-line if the signal is not received within a predetermined time interval.

10. A method for updating Domain Name System (DNS) information in response to a change in client status, the method comprising the steps of:
    receiving identification information from a client, the client being subscribed to a domain name;
    on receipt of the identification information, assigning an IP address to the client and updating an IP address table on the DNS server such that the domain name corresponds to the assigned IP address;
    determining a client status of on-line or off-line; and responsive to determining the status is off-line, updating the IP address table on the DNS server such that the domain name corresponds to a first web page located on a server.

11. The method of claim 10, further comprising:
on receipt of the client request, connecting the client to a second web page associated with the client, wherein the second web page includes at least one of messages received while client was off-line, a time of last log-on by client, or a duration the client was off-line.

12. The method of claim 10, further comprising:
on receipt of the client request, determining if the client is authorized to administer the domain name.

13. A computer-readable medium containing a program for updating Domain Name System (DNS) information in response to a change in client on-line/off-line status, the program comprising the steps of:
receiving a client request to update DNS information on a DNS server, the client being subscribed to a domain name;
on receipt of the client request, assigning an IP address to the client and updating an entry in an IP address table on the DNS server to match the domain name with the assigned IP address;
determining a client status of on-line or off-line; and
responsive to off-line determination, updating the IP address table on the DNS server to match the domain name with an interactive file.

14. The method of claim 13, wherein the interactive file comprises a first web page that is configured to provide information to the client and configured to allow the client to leave a message for a second client.

15. The method of claim 13, further comprising:
on receipt of the client request, connecting the client to a second web page associated with the client.

16. The method of claim 15, wherein the second web page includes at least one of messages received while client was off-line, a time of last log-on by client, or a duration the client was off-line.

17. The method of claim 13, further comprising:
on receipt of the client request, determining if the client is authorized to administer the domain name.

18. The method of claim 13, wherein the update step further comprises:
queuing the client request on a DNS update queue;
moving the request from the DNS update queue to a temporary queue; and
updating the IP address table of the DNS server with the request from the temporary queue.

19. The method of claim 18, further comprising:
notifying the client that the request has been queued; and
notifying the client that the request has been processed.

20. The method of claim 13, wherein the determining step further comprises:
monitoring arrival of a signal that is periodically transmitted by the client, the arrival of the signal indicating that the status of the client is on-line.

21. The method of claim 20, wherein the determining step further comprises:
determining that the status of the client is off-line if the signal is not received within a predetermined time interval.

22. A system for updating Domain Name System (DNS) information in response to a change in client status, the system comprising:
means for receiving a client request to update DNS information on a DNS server, the client being subscribed to a domain name;
means for assigning, on receipt of the client request, an IP address to the client and updating an entry in an IP address table on the DNS server such that the domain name corresponds with the assigned IP address;
means for determining a client status of on-line or off-line; and
means for updating, responsive to off-line determination, the IP address table on the DNS server such that the domain name corresponds with a first web page, wherein the first web page is configured to provide information to the first client and configured to allow the first client to leave a message for the second client.

23. The method of claim 22, further comprising:
means for connecting, on receipt of the client request, the client to a second web page associated with the client, wherein the second web page includes at least one of messages received while client was off-line, a time of last log-on by client, or a duration the client was off-line.

24. The method of claim 22, further comprising:
means for determining, on receipt of the client request, if the client is authorized to administer the domain name.

25. The method of claim 22, wherein the means for updating further comprises:
means for queuing the client request on a DNS update queue;
means for moving the request from the DNS update queue to a temporary queue; and
means for updating the IP address table of the DNS server with the request from the temporary queue.

26. The method of claim 22, further comprising:
means for notifying the client that the request has been queued; and
means for notifying the client that the request has been processed.

27. The method of claim 22, wherein the means for determining the client status further comprises:
means for monitoring arrival of a signal that is periodically transmitted by the client, the arrival of the signal indicating that the status of the client is on-line.

28. The method of claim 22, wherein the means for determining client status further comprises:
means for determining that the status of the client is off-line if the signal is not received within a predetermined time interval.

* * * * *